United States Patent
Meidar et al.

(10) Patent No.: US 9,126,301 B2
(45) Date of Patent: Sep. 8, 2015

(54) METHOD AND MACHINE TOOL FOR MACHINING OF METALLIC WORKPIECES

(76) Inventors: Moshe Israel Meidar, New York, NY (US); Wolfgang Horn, Goppingen (DE); Holger H. Kolb, Ludwigsburg (DE); Douglas J. Watts, Harrison Township, MI (US)

(*) Notice: Subject to any disclaimer, the term of this patent is extended or adjusted under 35 U.S.C. 154(b) by 600 days.

(21) Appl. No.: 13/542,850

(22) Filed: Jul. 6, 2012

(65) Prior Publication Data

US 2013/0177363 A1    Jul. 11, 2013

(30) Foreign Application Priority Data

Jul. 8, 2011   (DE) .......................... 10 2011 078 896

(51) Int. Cl.
*B23Q 11/10*   (2006.01)
*B23Q 3/157*   (2006.01)
*B23Q 3/155*   (2006.01)

(52) U.S. Cl.
CPC ............ *B23Q 11/1053* (2013.01); *B23Q 3/155* (2013.01); *B23Q 3/157* (2013.01); *B23Q 11/1061* (2013.01); *Y10T 408/455* (2015.01);
(Continued)

(58) Field of Classification Search
CPC ............... B23Q 11/10; B23Q 11/1015; B23Q 11/1053; Y10T 483/15; Y10T 409/303976; Y10T 409/304032; Y10T 408/44; Y10T 408/45; Y10T 408/455; Y10T 407/14
USPC ....... 483/13; 451/449; 409/135, 136; 408/56, 408/57, 59; 407/11; 82/900
See application file for complete search history.

(56) References Cited

U.S. PATENT DOCUMENTS 3,726,363 A  *  4/1973  Sussman ...................... 184/39.1
5,509,335 A  *  4/1996  Emerson ........................ 82/1.11
(Continued)

FOREIGN PATENT DOCUMENTS

DE            60111162 T2     10/2005
DE         102007045045 A1     3/2009
(Continued)

OTHER PUBLICATIONS

PCT/EP2012/063223 International Search Report and Written Opinion; Mailing Date: Sep. 10, 2012; 8 pages.
(Continued)

*Primary Examiner* — Erica E Cadugan
*Assistant Examiner* — Michael Vitale
(74) *Attorney, Agent, or Firm* — Reising Ethington P.C.

(57) ABSTRACT

In a method and a machine tool for machining metallic workpieces, a cooling device is provided to supply a cryogenic coolant to a first tool and a precooling device is provided to supply the cryogenic coolant to a second tool. The first tool is held in a first chuck and processes a workpiece, with the first tool during processing being cooled via the cryogenic coolant. The second tool is held in a second chuck and will subsequently be used for processing the workpiece. The second tool is supplied via the precooling device with the cryogenic coolant and thus cooled to the operating temperature required for processing. Due to the fact that the second tool is precooled to the required processing temperature, after the change of tools, the processing of the workpiece can be continued immediately. By precooling the second tool during the primary processing time, the total processing time of the workpiece is reduced, providing the machine tool with higher productivity.

15 Claims, 8 Drawing Sheets

(52) U.S. Cl.
CPC ............... *Y10T 409/303752* (2015.01); *Y10T 409/304032* (2015.01); *Y10T 483/15* (2015.01)

(56) References Cited

U.S. PATENT DOCUMENTS

| | | | |
|---|---|---|---|
| 5,535,496 A * | 7/1996 | Sugino et al. | 29/39 |
| 5,595,462 A * | 1/1997 | Hensley | 409/132 |
| 7,252,024 B2 * | 8/2007 | Zurecki et al. | 82/1.11 |
| 8,074,542 B2 * | 12/2011 | Zwara et al. | 82/50 |
| 2008/0206004 A1 * | 8/2008 | Giannetti | 408/56 |
| 2010/0272530 A1 * | 10/2010 | Rozzi et al. | 408/56 |

FOREIGN PATENT DOCUMENTS

| | | |
|---|---|---|
| EP | 1208940 A2 | 5/2002 |
| EP | 1208940 B1 | 6/2005 |
| WO | 2009037071 A1 | 3/2009 |
| WO | WO 2011026864 A2 * | 3/2011 |

OTHER PUBLICATIONS

DE 10 2011 078 896.4 Office Action; Mailing Date: Apr. 16, 2012; 4 pages.

* cited by examiner

METHOD AND MACHINE TOOL FOR MACHINING OF METALLIC WORKPIECES

FIELD

The invention relates to a method for machining metallic workpieces in which a tool is precooled by connecting it to a source of coolant before it is used to machine a workpiece.

BACKGROUND

A machine tool is known from DE 601 11 162 T2 (equivalent to EP 1 208 940 B1) comprising a tool carousel for machining metallic workpieces. The tool carousel comprises several chucks, in which one tool each is arranged for processing the workpiece. Cryogenic coolant is guided through the tool carousel to the respective tool presently engaged with the workpiece to be processed. High productivity in processing workpieces is yielded by the effective cooling using said cryogenic coolant.

The invention is based on the objective to provide a method allowing higher productivity in machining metallic workpieces.

Using the method according to the invention, the productivity in processing workpieces is increased such that during processing of the workpiece by a first tool, a second tool provided for a subsequent processing is precooled by the cryogenic coolant simultaneously during processing. For the cryogenic processing of workpieces the tools first need to be cooled to the required low operating temperature before the machining process can begin. This cooling process for the cryogenic processing of workpieces can only begin in methods and machine tools of prior art when the tool provided for processing is located in the operating position and/or in the chuck provided for processing. For example, the cooling process in methods and machine tools of prior art can only begin when the tool provided for processing is located in the tool spindle connected to a supply line for the cryogenic coolant.

Due to the fact that as early as during the processing of the workpiece via a first tool the second tool provided for subsequent processing is being cooled by the cryogenic coolant, the precooling period required for the second tool is moved from the primary processing time into the secondary processing time. Due to this precooling simultaneous to the primary processing time, the workpiece, after being processed by the first tool, can directly be further processed without any additional precooling by the already precooled second tool. This way, no primary processing time is lost, in which the second tool had to be cooled to the lower processing temperature. The cryogenic processing of a workpiece can therefore be continued directly after the change of tools, with the second tool during processing being cooled by the cryogenic coolant.

The precooling of a tool provided for subsequent processing occurs for example via a precooling device, which can be coupled to a tool magazine, a tool carousel, or any other chuck.

The method ensures a simple and effective precooling of the second tool provided for processing. For example, liquid or gaseous nitrogen, liquid or gaseous oxygen, gaseous hydrogen, gaseous helium, liquid or gaseous argon, gaseous carbon dioxide, and liquid or gaseous natural gas may serve as the cryogenic coolant. Preferably, during processing, the same cryogenic coolant is used, preferably nitrogen, for the precooling and the subsequent cooling of a workpiece.

The method ensures a rapid and effective precooling of the tool provided for subsequent processing. Preferably the cryogenic coolant provides the lower temperature even when it hits and/or flows through the workpiece to be precooled.

The method ensures that the processing of the workpiece can be continued immediately after the change of tools. The change of tools may occur, for example, by the precooled second tool being changed into the first chuck, which may be embodied as a tool spindle, for example. Alternatively the change of tools can occur by the second chuck with the second tool held there and precooled being moved from a storage position into a processing position. This is the case, for example, in tool carousels, with the different tools being brought by way of rotation of the carousel disk from a storage position into the processing position. The precooling device is particularly embodied such that the tool exchange occurs so fast that the second tool provided for processing essentially does not heat up prior to the change into the processing position.

The method ensures an efficient precooling of the tool provided for processing.

The method allows precooling in a simple fashion. The precooling device comprises for example a thermally isolated reservoir for providing the cryogenic coolant and a corresponding cooling condenser for cooling the cryogenic coolant as well as a precoolant-feeding line to supply the cryogenic coolant from the reservoir to the second chuck. The precoolant supply line is preferably embodied in a thermally isolated fashion. Preferably the precoolant device is coupled to a cryogenic cooling device to cool the tools during processing such that for precooling and for cooling during processing, the cryogenic coolant is taken from the same reservoir.

The method ensures in a simple fashion that during the change of tools no cryogenic coolant escapes the precooling device in an uncontrolled fashion. This way, a long operating life of the machine tool is ensured because cryogenic coolant only flows out of the precooling device when a tool to be precooled is coupled thereto.

The method ensures a simple and efficient cooling of the tool provided for processing. The influx of cryogenic coolant is only released by the precooling device when the tool to be precooled is coupled to the precooling device.

The invention is further based on the objective to further develop a machine tool of the generic type such that an increase of productivity is yielded in the machining of metallic workpieces.

The advantages of the machine tool according to the invention are the same as the above-described advantages of the method according to the invention. The machine tool according to the invention comprises a cooling device for the cryogenic cooling of the first tool, which is presently engaging the workpiece to be processed. Furthermore, the machine tool comprises a precooling device, serving to precool a second tool provided in a second chuck and intended for the subsequent processing of the workpiece. The cryogenic cooling device and the cryogenic precooling device are addressed by a control device such that during processing of the workpiece by a first tool the second tool provided for the subsequent processing of the workpiece is precooled and brought to the lower processing temperature required. This way, in the above-described manner, the precooling time for the second tool is changed from the primary processing time to the secondary processing time. After changing the second tool into the position intended for processing the workpiece the processing of the workpiece can continue immediately. This way, the primary processing time and/or cycle time for the tool processing is reduced and the productivity of the machine tool is increased.

The machine tool ensures a simple precooling of the tool provided for processing. Preferably the reservoir and the corresponding cooling condenser are both part of the precooling device as well as a part of the cooling device, so that the cooling of the tool processing the workpiece and the precooling of the tool provided for processing can occur with the same cryogenic cooling medium. For this purpose, a precoolant-supply line leads from the reservoir to the second chuck and a coolant-supply line from the reservoir to the first chuck.

The machine tool ensures effective precooling of the tool provided for processing. The supply of the cryogenic coolant to the tool to be pre-cooled is only released when the tool is mechanically coupled to the coupling unit. The release of the cryogenic coolant can occur either mechanically or electro-mechanically.

The machine tool ensures in a simple fashion the coupling and decoupling of the precooling device to and/or from the second chuck. For this purpose, either the precooling device can be arranged fixed at a basic frame of the machine tool and the second chuck can be displaceable or vice versa.

The machine tool ensures the precooling of a multitude of different tools in a simple fashion. The first chuck may be embodied as a common tool spindle, for example, which performs a tool exchange in the pick-up method and here places the first tool into the tool magazine and accepts the precooled second tool from the second chuck. Alternatively, a common tool changer may be used.

The machine tool ensures an efficient precooling and simultaneously an efficient cooling during processing. The reservoir is both a part of the precooling device as well as a part of the cooling device so that only one reservoir is required in order to guide the cryogenic coolant via the precoolant-supply line to the second chuck and via the coolant supply line to the first chuck.

The machine tool ensures efficient precooling and cooling of the respective tool. The supply lines preferably show a specific thermal conductivity at 0° C. of maximally 0.40 W/(mK), particularly no more than 0.30 W/(mK), and particularly no more than 0.20 W/(mK). By a thermally isolated embodiment any undesired heating of the cryogenic coolant is prevented over the path from the first and/or the second chuck. This way, the respective tool can be precooled and/or cooled extremely effectively. Preferably the supply lines are embodied entirely in a thermally insulated fashion, i.e. over their entire length. Furthermore, the supply lines are preferably embodied in a vacuum-isolated fashion. For this purpose they comprise an inner tube and an outer tube surrounding it, connected to each other and limiting an evacuated isolated space. In the vacuum-isolated embodiment the supply lines preferably show a specific thermal conductivity at 0° C. of no more than 0.01 W/(mK). In a vacuum-isolated embodiment preferably at least one of the tubes can be changed in its length so that a compensation to different longitudinal changes of the inner and the outer tube is possible. When the supply lines conduct the cryogenic coolant the respectively inner tube essentially assumes its temperature, while the respectively outer tube, based on the isolation medium arranged between the two tubes, cools considerably less. The inner tube changes its length therefore to a considerably greater extent than the outer tube. In order to avoid any damage to the supply lines at least one of the tubes is capable of changing its length. Preferably the outer tube comprises a pleated metallic bellows for a thermal compensation of length.

Additional features, advantages, and details of the invention are discernible from the following description of an exemplary embodiment.

DESCRIPTION OF THE PREFERRED EMBODIMENT

Figure 1:
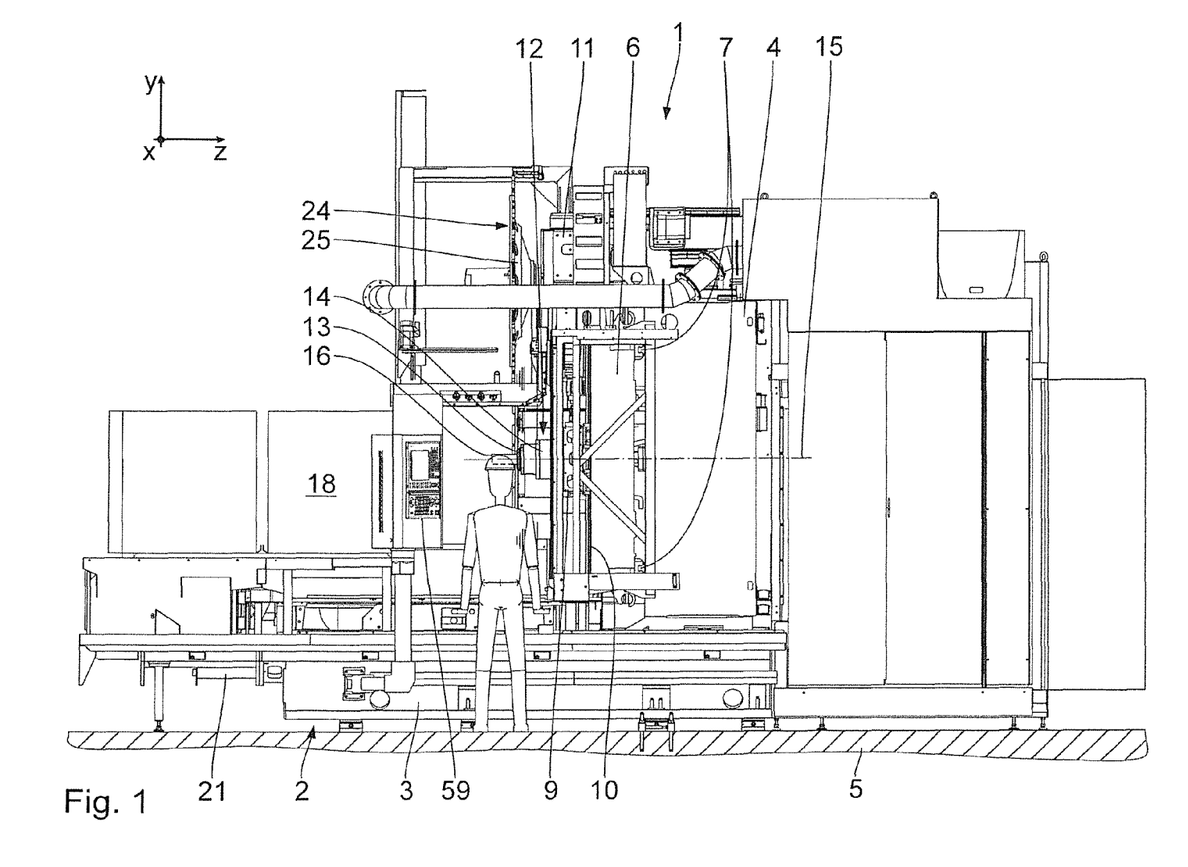
FIG. 1 shows a machine tool with a tool magazine and a preliminary cooling device cooperating therewith.

FIG. 1 shows a machine tool 1 comprising a base frame 2 with a machine bed 3 and a stand 4 arranged thereon. The machine bed 3 extends essentially in a horizontal x- and a horizontal z-direction. The stand 4 is fastened at its end at the machine bed 3 and essentially extends in the x-direction and a vertical y-direction. The base frame 2 is fastened on a base plate 5. The x-, y-, and z-directions each extend perpendicular in reference to each other and form a Cartesian coordinate system.

An x-sled 6 is arranged at the stand 4, which can be linearly displaced on the corresponding x-guidance rails 7 via an x-drive motor 8 parallel to the x-direction. A y-sled 9 is arranged in turn at the x-sled 6, which can be linearly displaced on the y-guidance rails 10 via a y-drive motor 11 parallel to the y-direction. A tool spindle 12 is fastened at the y-sled 9, comprising a first chuck 13 embodied as a clamping set, which can be rotationally driven via a drive motor 14 about a rotary axis 15 extending in the z-direction. A first tool 16 is held in the first chuck 13, serving for the cutting processing of a metallic workpiece 17.

Figure 2:
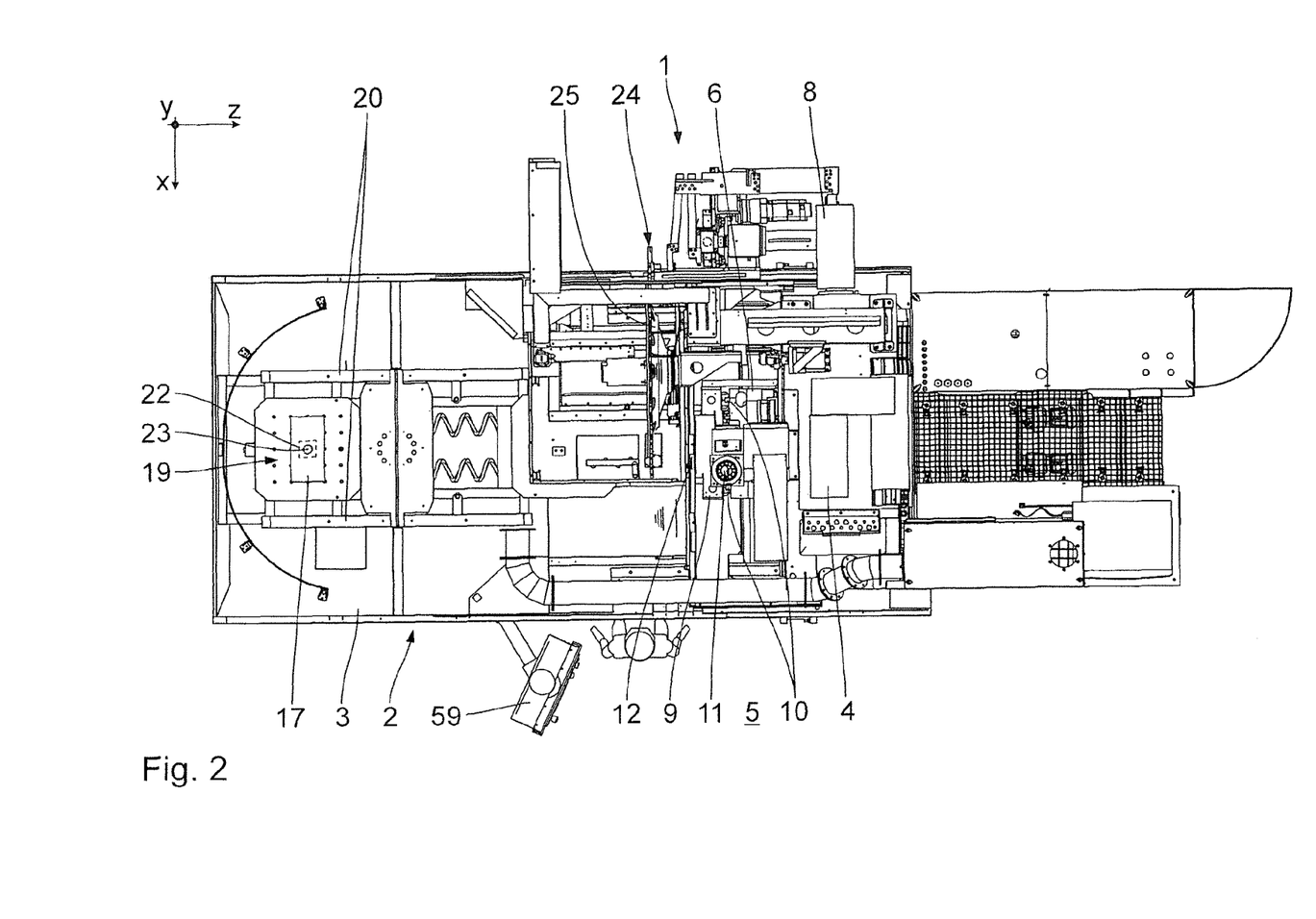
FIG. 2 is a top view of the machine tool in FIG. 1.

The machine tool 1 has a processing space 18 in front of the tool spindle 12 in which a workpiece support 19 for the workpiece 17 to be processed is arranged on the machine bed 3 as shown in FIG. 2. The workpiece support 19 is supported on z-guidance rails 20 and is linearly displaceable parallel to the z-direction via a z-drive motor 21. The workpiece support 19 is embodied as a rotary plate and is rotated by a drive motor 22 about a rotary axis 23 extending parallel to the y-direction. For example, workpiece pallets with workpieces 17 clamped thereon may be fastened on the rotary plate 19.

Figure 3:
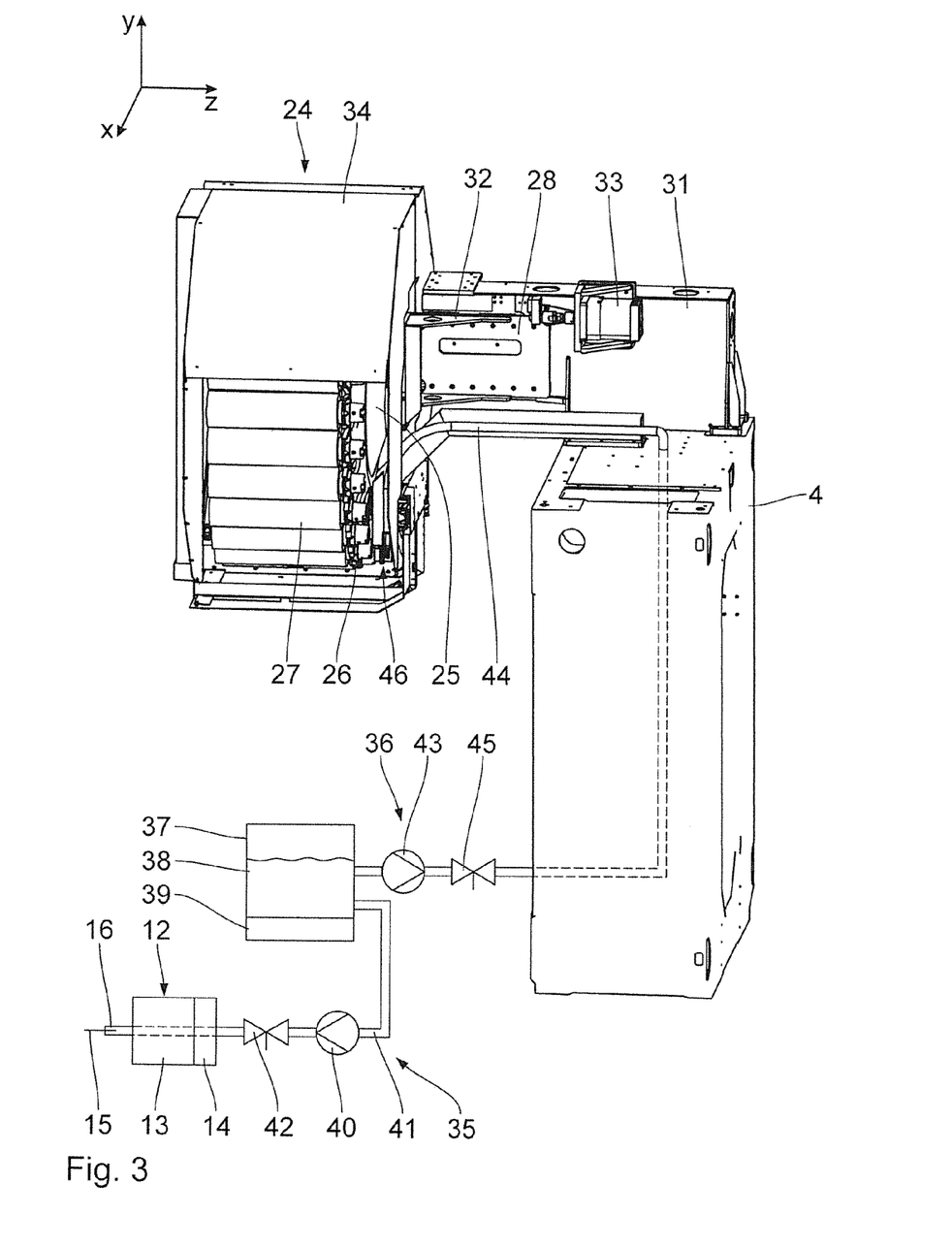
FIG. 3 is a schematic illustration of the precooling device cooperating with the tool magazine.
Figure 4:
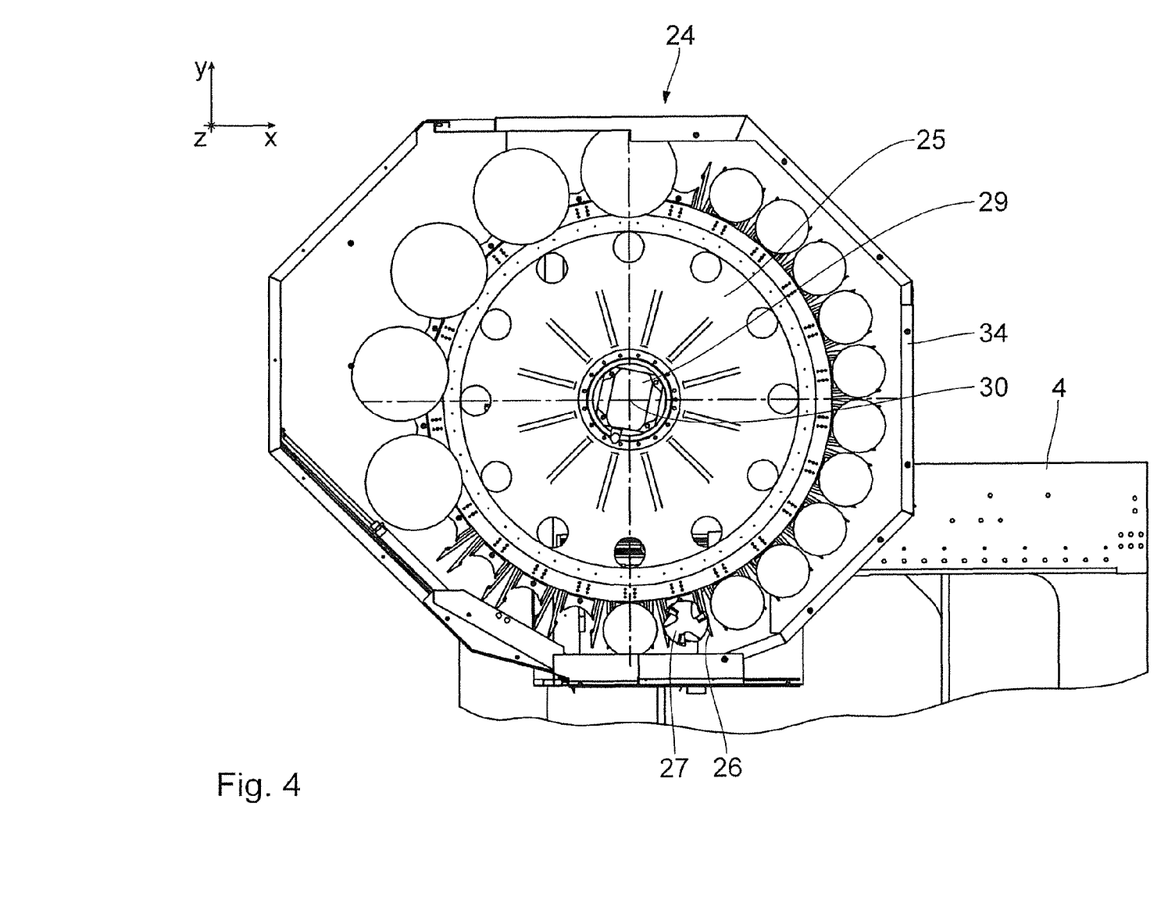
FIG. 4 is a front view of the tool magazine.

The machine tool 1 comprises a tool magazine 24 as shown in FIGS. 3 and 4 fastened at the stand 4. The tool magazine 24 is embodied as a disk magazine. Accordingly the tool magazine 24 comprises a magazine disk 25 with a plurality of chucks 26 arranged thereon. For the subsequent processing of the workpiece 17 different tools 27 are arranged in the chucks 26. The magazine disk 25 is supported for rotation at a magazine sled 28 and can be rotationally driven via a drive motor 29 about a rotary axis 30 relative to the magazine sled 28. The magazine sled 28 is arranged displaceable, parallel to the z-direction, at a magazine support 31, which in turn is fastened at a stand 4. For this purpose, z-guidance rails 32 are arranged at the magazine support 31, on which the magazine sleds 28 can be linearly displaced via a drive motor 33 parallel to the z-direction. The magazine disk 25 is partially surrounded by a magazine housing 34.

For the cryogenic cooling of the tools 16, 27, the machine tool 1 includes a cooling device 35 as well as a corresponding precooling device 36. The cooling device 35 and the precooling device 36 comprise a common reservoir 37 in order to provide a cryogenic coolant 38, embodied in a thermally isolated fashion. A cooling condenser 39 is provided to cool the cryogenic coolant 38. Using a first pump 40 the cryogenic coolant 38 can be fed via a coolant supply line 41 from the reservoir 37 to the first chuck 13 and/or the tool 16 held therein. A first shut-off valve 42 is arranged in the coolant supply line 41 to interrupt the supply of the cryogenic coolant 38 to the chuck 13. The reservoir 37, the cooling condenser 39, the pump 40, the coolant supply line 41, and the shut-off valve 42 form the cooling device 35.

In order to precool one of the secondary tools 27 the cryogenic coolant 38 can be supplied via a second pump 43 from the reservoir 37 through the precoolant-supply line 44 to one of the secondary chucks 26 of the tool magazine 24. In the precoolant-supply line 44, in order to shut off the supply of cryogenic coolant 38, a second shut-off valve 45 is arranged. The reservoir 37, the cooling condenser 39, the pump 43, the precoolant-supply line 44, the shut-off valve 45, and a coupling unit 46, described in the following, form the precooling device 36. The supply lines 41, 44 are embodied in a vacuum-insulated fashion to avoid any undesired heating of the cryogenic coolant 38.

Figure 5:
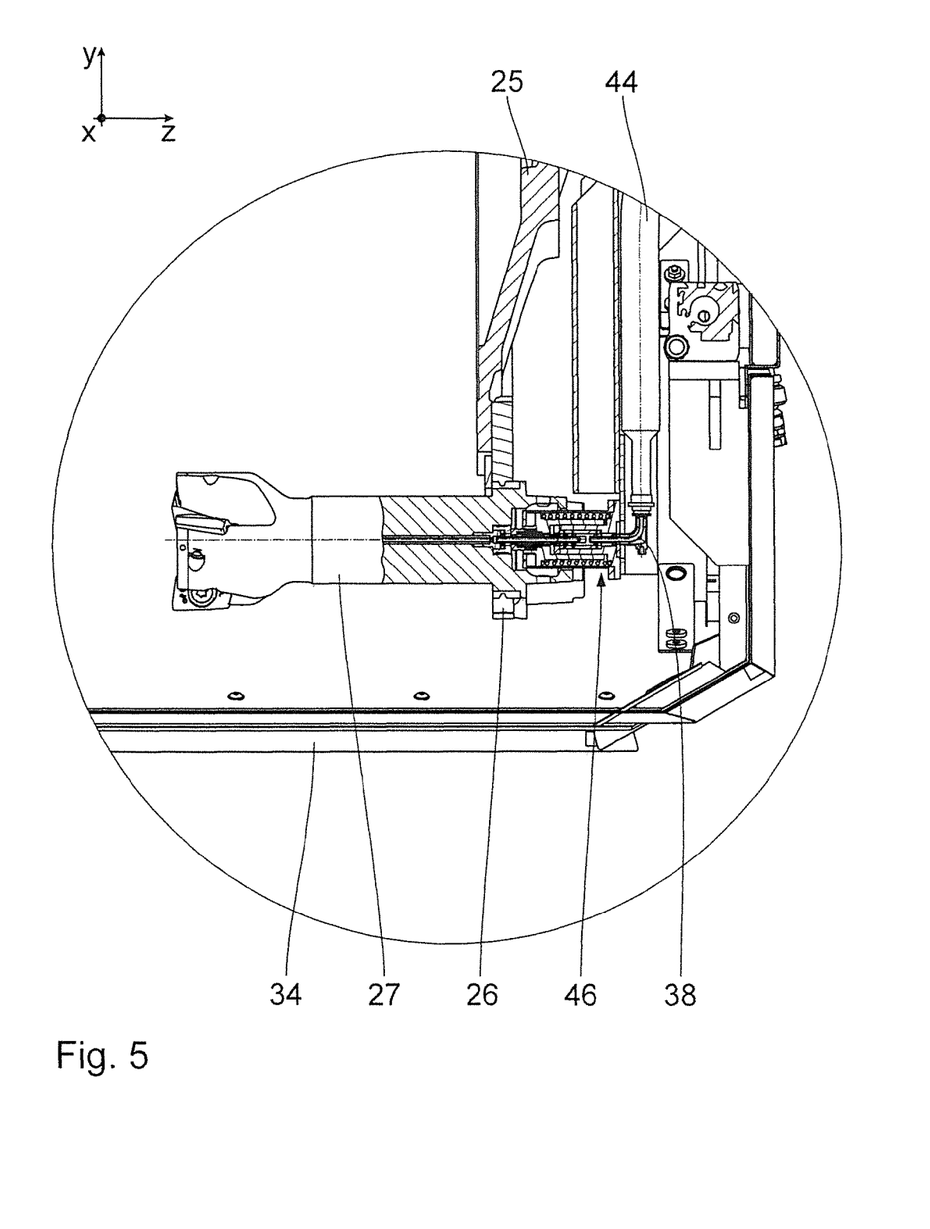
FIG. 5 is a cross-section of a coupling unit of the precooling device coupled to a tool to be pre-cooled.
Figure 7:
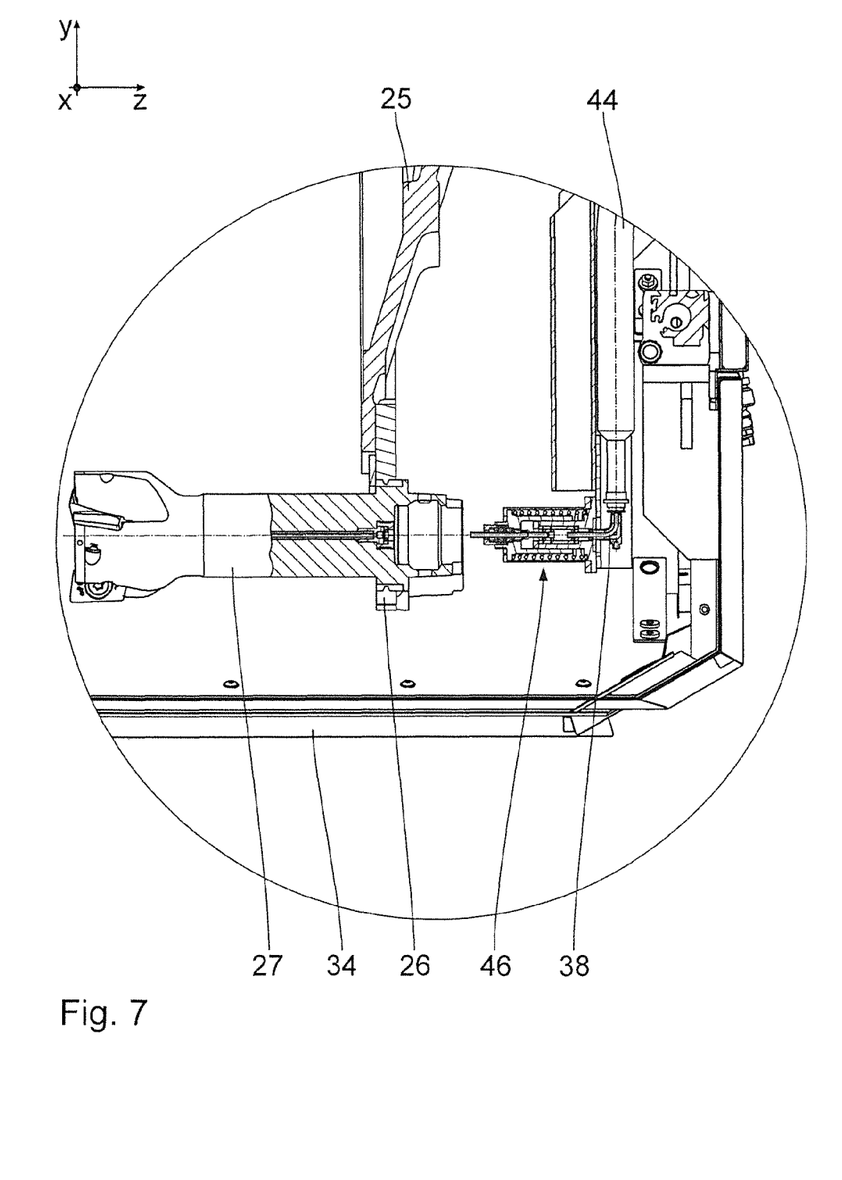
FIG. 7 is a cross-section of the coupling unit of the precooling device decoupled from the precooled tool.
Figure 8:
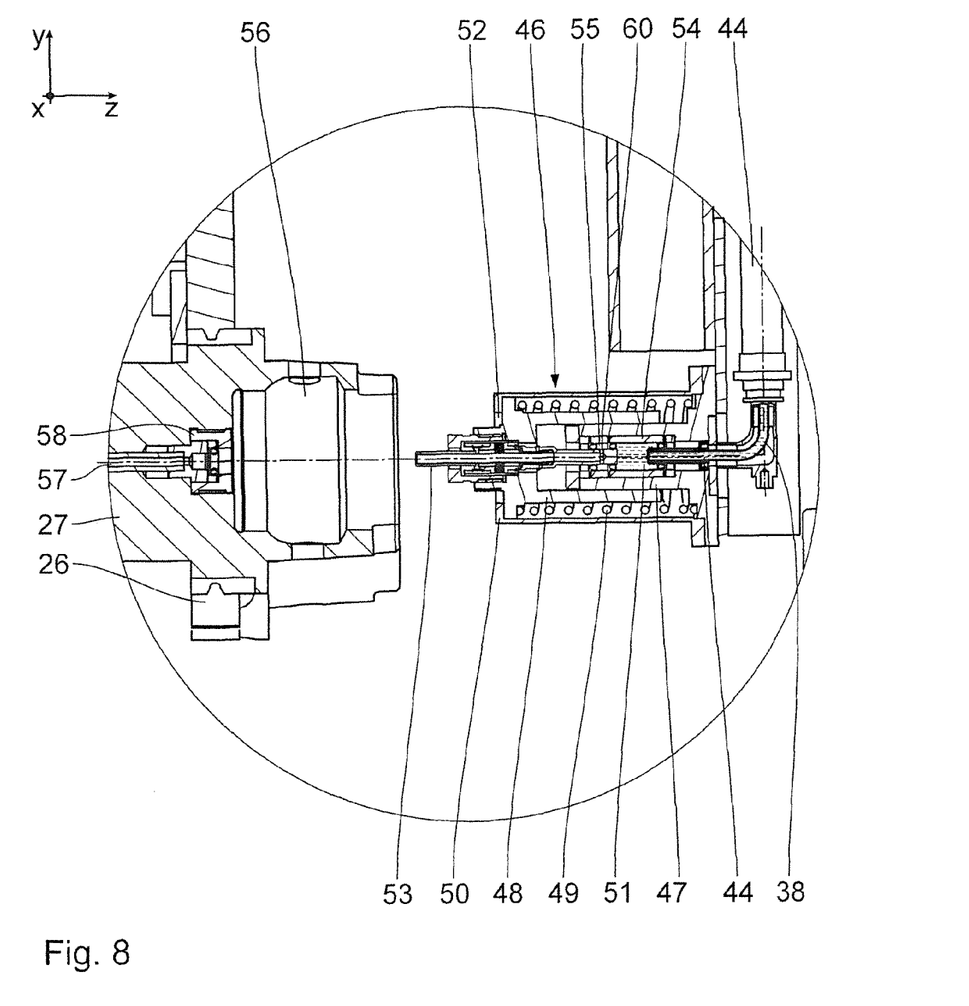
FIG. 8 is an enlarged illustration of the coupling unit in FIG. 7.

As shown in FIGS. 5, 7, and 8, the coupling unit 46 is arranged with one end at a precoolant-supply line 44 and embodied such that the supply of the cryogenic coolant 38 is released to the respectively secondary tool 27 when the tool 27 is mechanically coupled to the coupling unit 46 and the supply of the cryogenic coolant 38 to the respective tool 27 is interrupted when the tool 27 is mechanically decoupled from the coupling unit 46. For a mechanical coupling and/or decoupling of the respective tool 27 to/from the coupling unit 46 the chucks 26 of the tool magazine 24 are linearly displaceable in reference to the coupling unit 46 via the drive motor 33.

Figure 6:
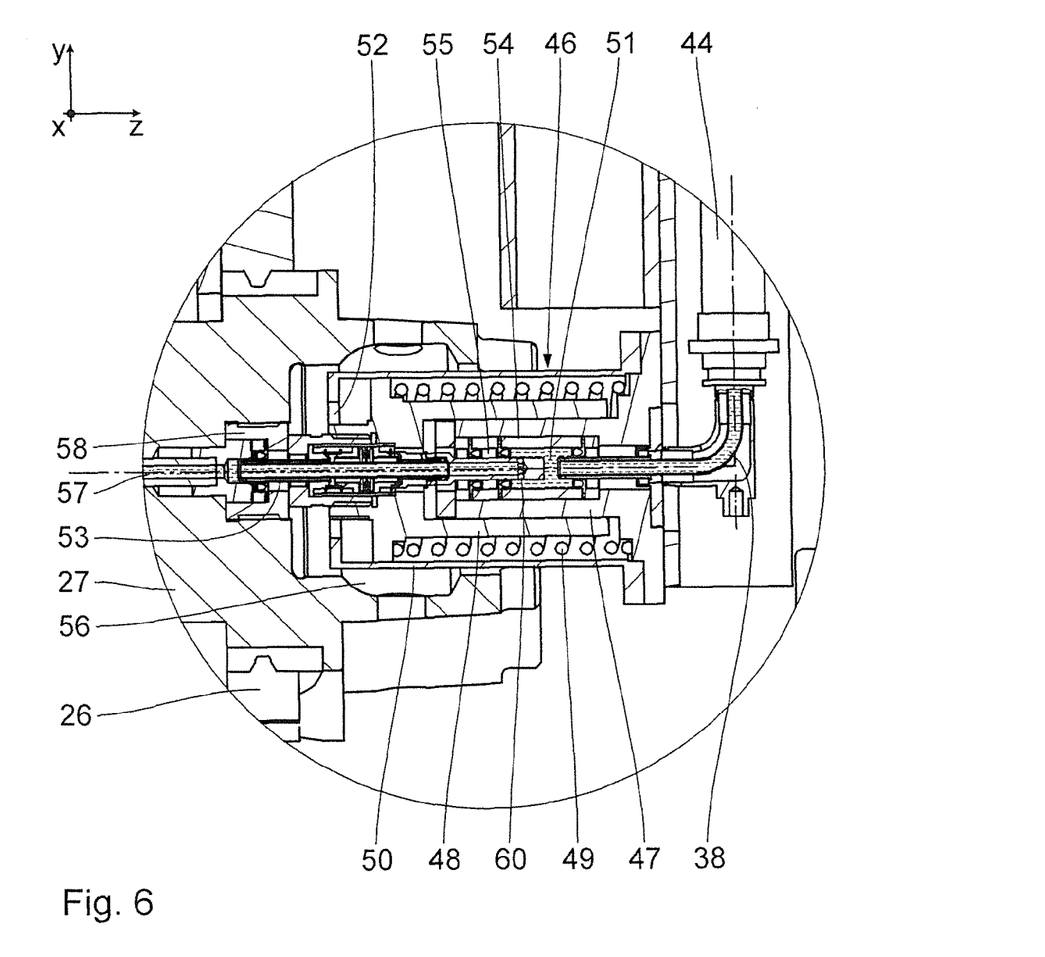
FIG. 6 is an enlarged illustration of the coupling unit of FIG. 5.

As shown in FIG. 6, the coupling unit 46 is fastened at the magazine housing 34 and embodied as a spring-loaded slider. For this purpose, the coupling unit 46 comprises an inner slider 47 and an outer slider 48, which are embodied telescopically in reference to each other and are pre-stressed by a spring element 49. The sliders 47, 48 and the spring element 49 are arranged in an allocated housing 50. The sliders 47, 48 limit an inner chamber 51, in which the precoolant-supply line 44 is guided. The housing 50 shows a penetrating opening 52 on the side facing the tool 27, through which a coupling line 53 is guided from the inner space 51 towards the outside. The coupling line 53 is closed at the face of the end arranged in the inner space 51, however at its end it comprises entry openings 60 over its circumference. The inner slider 47 comprises a releasing section 54 and a closing section 55 for opening and/or closing these entry openings 60 at a side facing the coupling line 53.

The coupling unit 46 is embodied such that it can be inserted into a fastening recess 56 of the tool 27 and the coupling line 53 can be connected to a coolant duct 57 extending in the tool 27. For this purpose, a sealing insert 58 is arranged at the coolant duct 57, by which the outer slider 48 can be operated when the tool 27 is coupled.

In order to control the machine tool 1, it is provided with a control device 59 embodied such that during processing of the workpiece 17 via a first tool 16 the second tool 27 provided for the subsequent processing of the workpiece 17 is precooled via the cryogenic coolant 38.

In order to process the workpiece 17 it is clamped in a conventional fashion on the workpiece support 19 and the first tool 16 is clamped in a first chuck 13 of the tool spindle 12. The workpiece 17 is processed in a common fashion by the tool 16, by the workpiece support 19 and/or the tool spindle 12 being linearly displaced in the x-, y-, and/or z direction. The first tool 16 is cooled during processing by the cryogenic coolant 38. For this purpose, the cryogenic coolant 38 is conveyed by a pump 40 from the reservoir 37 via the coolant supply line 41 to the tool spindle 12. The coolant supply line 41 is coupled to the coolant duct 57 of the tool 16 so that the tool 16 during processing receives and is cooled by the cryogenic coolant 38. The cryogenic coolant 38 is selected from the group consisting of nitrogen, oxygen, hydrogen, helium, argon, carbon dioxide, natural gas and mixtures thereof. Preferably, nitrogen is the cryogenic coolant 38.

When exiting the tool 16, the cryogenic coolant 38 preferably shows a temperature of less than −60° C., particularly less than −120° C., particularly less than −150° C., and particularly less than −180° C.

When processing the workpiece 17 the second tool 27 provided for the subsequent processing of the workpiece 17 is arranged in the tool magazine 24 at a precooling position and connected via the coupling unit 46 to the precooling device 36. This is illustrated in FIGS. 5 and 6. The cryogenic coolant 38 is supplied via the pump 43 from the reservoir 37 through the precoolant-supply line 44 to the coupling unit 46, which due to the mechanic coupling to the tool 27 releases the supply with cryogenic coolant 38. For this purpose, the sealing insert 58 contacts the outer slider 48 such that the inlet openings 60 are released to the coupling line 53 and thus also the supply of the cryogenic coolant 38 to the tool 27. The cryogenic coolant 38 therefore flows through the tool 27 and cools it to the operating temperature required for processing. This precooling process occurs simultaneous to the processing of the workpiece 17. When cooling the tool 27 the cryogenic coolant 38 shows a temperature of less than −60° C., particularly less than −120° C., particularly less than −150° C., and particularly less than −180° C.

When the processing of the workpiece 17 via the tool 16 is concluded, the tools are changed. For this purpose, the magazine disk 25 with the chucks 26 and the tools 27 accepted therein are first displaced parallel in reference to the z-direction via the drive motors 33 such that the coupling unit 46 is decoupled from the precooled tool 27.

The outer slider 48 is displaced by the pre-stressed spring element 49 such that the closing section 55 is arranged in the area of the entry openings 60 of the coupling line 53 so that the supply of the cryogenic coolant 38 to the coupling line 53 is interrupted. Subsequently the magazine disk 25 is rotated about the rotary axis 30 such that an empty chuck 26 is arranged at the tool exchange place. Subsequently the tool spindle 12 is moved to the tool magazine 24 and places the tool 16 into the empty chuck 26.

Subsequently the magazine disk 25 is moved about the rotary axis 30 such that the pre-cooled tool 27 is arranged at the tool changing site and here is accepted by the free tool spindle 12. By the tool spindle 12 moving, the second tool 27 is moved into a processing position to the workpiece 17 to be processed further. At the beginning of the processing of the workpieces 17, the second tool 27 shows a temperature of maximally −60° C., particularly maximally −120° C., especially maximally −150° C., and preferably maximally −180° C. If the second tool 27 after decoupling from the precooling device 36 has excessively heated it can already be cooled via the cooling device 35 prior to processing the workpiece 17 in the tool spindle 12.

When processing the workpiece 17 via the second tool 27 it is cooled in the above-described manner via the cryogenic coolant 38.

During the processing of the workpiece 17 with the tool 27 the magazine disk 25 is rotated about the rotary axis 30 such that a tool 27 provided for the subsequent processing of the workpiece 17 is once more arranged at the pre-cooling site. By a linear displacement of the magazine disk 25 the tool 27 located at the pre-cooling site is mechanically coupled with the coupling unit 46. Here, the gasket set 58 of the tool 27 operates the outer slider 48 against the spring force of the spring element 49 such that the release section 54 is arranged in the area of the entry openings 60 of the coupling line 53 and releases the supply of the cryogenic coolant 38 to the tool 27. The cryogenic coolant 38 flows through the coupling line 53 and the cooling duct 57 and cools the tool 27 provided for the subsequent processing to the processing temperature required.

The invention claimed is:

1. A method for machining metallic workpieces with comprising the following steps:
    processing a workpiece using a first tool, wherein
        the first tool is held in a first chuck; and,
    the first tool is cooled during processing the workpiece by a cryogenic coolant;
    precooling a second tool to be used for processing the workpiece, wherein
        the second tool is held by a second chuck; and,
    the second tool is cooled by the cryogenic coolant while the first tool is processing the workpiece; and,
    processing the workpiece using the precooled second tool, wherein the second tool during processing is cooled by the cryogenic coolant.

2. A method according to claim 1, wherein the cryogenic coolant is selected from the group consisting of nitrogen, oxygen, hydrogen, helium, argon, carbon dioxide, natural gas, and mixtures thereof.

3. A method according to claim 1, wherein during precooling of the second tool, the cryogenic coolant is at a temperature of less than −60° C.

4. A method according to claim 1, wherein the second tool while it is processing the workpiece is at a temperature of less than −60° C.

5. A method according to claim 1 further comprising the step of flowing the cryogenic coolant through the second tool during precooling.

6. A method according to claim 1 further comprising the step of mechanically coupling the second tool to a precooling device used for storing and supplying the cryogenic coolant.

7. A method according to claim 6 further comprising the steps of:
    decoupling the second tool from the precooling device by a relative motion between the second chuck and the precooling device; and,
    interrupting an outflow of the cryogenic coolant from the precooling device to the second tool when the second tool is decoupled from the precooling device.

8. A method according to claim 6 further comprising the steps of:
    coupling a third tool provided for a subsequent processing of the workpiece by a relative motion between a third chuck and the precooling device and,
    releasing supply of the cryogenic coolant to the third tool.

9. A method according to claim 1, wherein during precooling of the second tool, the cryogenic coolant is at a temperature of less than −120° C.

10. A method according to claim 1, wherein during precooling of the second tool, the cryogenic coolant is at a temperature of less than −150° C.

11. A method according to claim 1, wherein during precooling of the second tool, the cryogenic coolant is at a temperature of less than −180° C.

12. A method according to claim 1, wherein the second tool while it is processing the workpiece is at a temperature of less than −120° C.

13. A method according to claim 1, wherein the second tool while it is processing the workpiece is at a temperature of less than −150° C.

14. A method according to claim 1, wherein the second tool while it is processing the workpiece is at a temperature of less than −180° C.

15. A method according to claim 1 further comprising supplying cryogenic coolant to the first tool and the second tool from a common reservoir.

* * * * *